US008810363B2

(12) United States Patent
Sakamoto et al.

(10) Patent No.: US 8,810,363 B2
(45) Date of Patent: Aug. 19, 2014

(54) ENGINE STARTING/STOPPING SWITCH DEVICE

(75) Inventors: Hiroshi Sakamoto, Miyazaki (JP); Makoto Honkawa, Miyazaki (JP); Keisuke Hidaka, Miyazaki (JP); Koji Masubuchi, Miyazaki (JP); Kazuto Kaneshige, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 372 days.

(21) Appl. No.: 13/376,421

(22) PCT Filed: Jun. 22, 2010

(86) PCT No.: PCT/JP2010/060517
§ 371 (c)(1),
(2), (4) Date: Dec. 6, 2011

(87) PCT Pub. No.: WO2011/013465
PCT Pub. Date: Feb. 3, 2011

(65) Prior Publication Data
US 2012/0075063 A1  Mar. 29, 2012

(30) Foreign Application Priority Data
Jul. 29, 2009   (JP) ................................. 2009-176374

(51) Int. Cl.
*G05B 19/00* (2006.01)
*G05B 23/00* (2006.01)
(Continued)

(52) U.S. Cl.
CPC ................ *B60R 25/04* (2013.01); *H01H 27/00* (2013.01); *H01H 2231/026* (2013.01); *H01H 13/023* (2013.01); *F02N 11/0803* (2013.01); *F02N 2200/10* (2013.01); *H01H 2300/032* (2013.01); *H01H 9/0271* (2013.01)

USPC ..................... 340/5.62; 340/5.31; 340/426.17; 340/426.3; 340/426.35; 340/426.36; 180/279; 180/283; 307/10.3; 307/10.5

(58) Field of Classification Search
CPC .................. G07C 9/00309; G07C 2009/00793; G07C 2209/63; B60R 25/24; B60R 25/04
USPC .......... 340/5.62, 5.31, 426.17, 426.3, 426.35, 340/426.36; 180/279, 283; 307/10.3–10.5
See application file for complete search history.

(56) References Cited
U.S. PATENT DOCUMENTS
5,982,295 A * 11/1999 Goto et al. ................. 340/10.52
(Continued)

FOREIGN PATENT DOCUMENTS
CN      1537757 A    10/2004
(Continued)

OTHER PUBLICATIONS
Supplementary European Search Report, completion of search Oct. 4, 2013.

*Primary Examiner* — Daniel Wu
*Assistant Examiner* — Emily C Terrell
(74) *Attorney, Agent, or Firm* — Carrier Blackman & Associates, P.C.; Joseph P. Carrier; William D. Blackman

(57) ABSTRACT

An engine starting/stopping switch device is provided that includes a switch unit that switches over switching modes in response to linear movement of a movable member, a push button that is linked to the movable member so as to drive the movable member in response to a pushing operation, and a coil antenna that outputs transponder drive radio waves for generating an electromotive force in a transponder built into a portable device, wherein the coil antenna (15) is disposed coaxially with the push button (14) so that at least part of the coil antenna (15) is inserted into the interior of the push button (14). This enables the operability of a push button to be improved and enables the size in the radial direction of the push button to be reduced.

7 Claims, 7 Drawing Sheets

(51) Int. Cl.
*G06F 7/00* (2006.01)
*H04B 1/00* (2006.01)
*H04Q 1/00* (2006.01)
*B60R 25/10* (2013.01)
*B60K 28/10* (2006.01)
*B60L 3/04* (2006.01)
*B62D 1/24* (2006.01)
*B60R 25/04* (2013.01)
*H01H 13/02* (2006.01)
*H01H 27/00* (2006.01)
*F02N 11/08* (2006.01)
*H01H 9/02* (2006.01)

(56) References Cited

U.S. PATENT DOCUMENTS

| | | | |
|---|---|---|---|
| 7,033,662 B2 | 4/2006 | Togawa et al. | |
| 7,187,266 B2 | 3/2007 | Hasegawa et al. | |
| 7,227,447 B2 | 6/2007 | Ohtaki et al. | |
| 7,290,416 B2 | 11/2007 | Ohtaki et al. | |
| 7,591,158 B2 | 9/2009 | Konno et al. | |
| 7,791,454 B2 * | 9/2010 | Egawa et al. | 340/10.5 |
| 8,542,092 B2 * | 9/2013 | Lumley et al. | 340/5.62 |
| 2003/0231100 A1 * | 12/2003 | Chung | 340/5.2 |
| 2004/0004397 A1 * | 1/2004 | Nagae et al. | 307/10.3 |
| 2004/0207516 A1 | 10/2004 | Ohtaki et al. | |
| 2007/0241862 A1 | 10/2007 | Dimig et al. | |
| 2007/0252681 A1 * | 11/2007 | Costello et al. | 340/426.3 |
| 2009/0091434 A1 * | 4/2009 | Tamezane et al. | 340/426.36 |
| 2009/0115250 A1 * | 5/2009 | Kim | 307/10.5 |
| 2011/0121925 A1 | 5/2011 | Emmerling et al. | |

FOREIGN PATENT DOCUMENTS

| | | |
|---|---|---|
| CN | 1607141 A | 4/2005 |
| DE | 10 2006 059 461 A1 | 6/2008 |
| JP | 63-143714 U | 6/1988 |
| JP | 64-31634 U | 2/1989 |
| JP | 2-123 U | 1/1990 |
| JP | 7-41926 U | 7/1995 |
| JP | 2003-051225 A | 2/2003 |
| JP | 2004-237887 A | 8/2004 |
| JP | 2004-314806 A | 11/2004 |
| JP | 2006-219946 A | 8/2006 |
| JP | 2008-254672 A | 10/2008 |
| JP | 2009-123434 A | 6/2009 |
| JP | 2010-095016 A | 4/2010 |
| JP | 2010-213081 A | 9/2010 |
| WO | 2007/120635 A2 | 10/2007 |
| WO | 2010/012776 A1 | 2/2010 |

* cited by examiner

ENGINE STARTING/STOPPING SWITCH DEVICE

TECHNICAL FIELD

The present invention relates to an engine starting/stopping switch device that includes a switch unit that switches over switching modes in response to linear movement of a movable member, a push button that is formed into a bottomed cylindrical shape with a front end thereof closed and is linked to the movable member so as to drive the movable member in response to a pushing operation, and a coil antenna that outputs transponder drive radio waves for generating an electromotive force in a transponder built into a portable device, placing the portable device in the vicinity of the push button enabling ID signal verification between the transponder and a vehicle to be carried out when the voltage of a battery built into the portable device is low.

BACKGROUND ART

With regard to a smart ignition system in which an engine is started by means of conduction of an ignition switch due to operation of a push button provided that ID code coincidence is found by intercommunication of ID codes executed between a vehicle and a portable device, a switch device in which, for an emergency when an ID code is no longer transmitted from the portable device due to exhaustion of a battery of the portable device, an electromotive force is generated in a transponder by means of transponder drive radio waves outputted from a coil antenna as a result of placing the portable device in the vicinity of the push button to thus make the transponder output an ID code, is known from Patent Document 1.

RELATED DOCUMENTS

Patent Documents

Patent Document 1: Japanese Patent Application Laid-open No. 2004-314806

SUMMARY OF THE INVENTION

Problems to be Solved by the Invention

However, in the arrangement disclosed in Patent Document 1, since the coil antenna is disposed so as to surround the push button, which has a bottomed cylindrical shape, the degree of freedom in the outer diameter and shape of the push button might be restricted, whereby there is a possibility of inhibiting any improvement in operability. Furthermore, since it is necessary to dispose a member for supporting the coil antenna on the outside of the push button, the switch device increases in size in the radial direction of the push button.

The present invention has been accomplished in light of such circumstances, and it is an object thereof to provide an engine starting/stopping switch device that enables the operability of a push button to be improved and enables the size in the radial direction of the push button to be reduced.

Means for Solving the Problems

In order to attain the above object, according to a first aspect of the present invention, there is provided an engine starting/stopping switch device comprising a switch unit that switches over switching modes in response to linear movement of a movable member, a push button that is formed into a bottomed cylindrical shape with a front end thereof closed and is linked to the movable member so as to drive the movable member in response to a pushing operation, and a coil antenna that outputs transponder drive radio waves for generating an electromotive force in a transponder built into a portable device, placing the portable device in the vicinity of the push button enabling ID signal verification between the transponder and a vehicle to be carried out when the voltage of a battery built into the portable device is low, characterized in that the coil antenna is disposed coaxially with the push button so that at least part of the coil antenna is inserted into the interior of the push button.

Further, according to a second aspect of the present invention, in addition to the first aspect, a circuit board extending parallel to the direction of movement of the movable member is disposed to a side of a switch case of the switch unit, and a recess into which an electronic component mounted on the circuit board is inserted is provided in the switch case.

Furthermore, according to a third aspect of the present invention, in addition to the first aspect, a circuit board connected to the coil antenna via a terminal is disposed so as to follow a plane that is perpendicular to an axis of the coil antenna.

Moreover, according to a fourth aspect of the present invention, in addition to the second or third aspect, a connector is directly fixed to the circuit board.

Further, according to a fifth aspect of the present invention, in addition to the third aspect, an extended portion extending parallel to the axis of the coil antenna is provided integrally with the terminal, and the extended portion is connected to the circuit board.

Effects of the Invention

In accordance with the first aspect of the present invention, since at least part of the coil antenna, which is coaxial with the push button, is inserted into the interior of the push button, the degree of freedom in the outer diameter and shape of the push button increases, and the operability can be enhanced by increasing the size of the push button. Moreover, it is unnecessary for a member for supporting the coil antenna to be disposed on the outside of the push button, the switch device can be reduced in size in the radial direction of the push button, and the space for mounting it in a vehicle can be reduced compared with a conventional switch device.

Furthermore, in accordance with the second aspect of the present invention, since the circuit board, which extends parallel to the direction of movement of the movable member, that is, the direction of operation of the push button, is disposed to the side of the switch case, and the electronic component mounted on the circuit board is inserted into the recess provided in the switch case, it is possible to further reduce the size of the switch device in the radial direction of the push button.

In accordance with the third aspect of the present invention, since the circuit board is disposed along a plane that is perpendicular to the axis of the coil antenna, it is possible to reduce the size of the switch device in the axial direction of the coil antenna and the push button.

In accordance with the fourth aspect of the present invention, since the connector is directly fixed to the circuit board, the structure can be simplified, and assembly of the circuit board and the connector can be made easy with the connector being fixed to the circuit board in advance.

Moreover, in accordance with the fifth aspect of the present invention, since the extended portion, which extends parallel to the axis of the coil antenna, is provided integrally with the terminal connecting the coil antenna and the circuit board, and the extended portion is connected to the circuit board, connection between the coil antenna and the circuit board is possible with a terminal having a simple shape, and connecting the terminal to the circuit board is made easy, thus enhancing the ease of assembly.

EXPLANATION OF REFERENCE NUMERALS AND SYMBOLS

Figure 1:
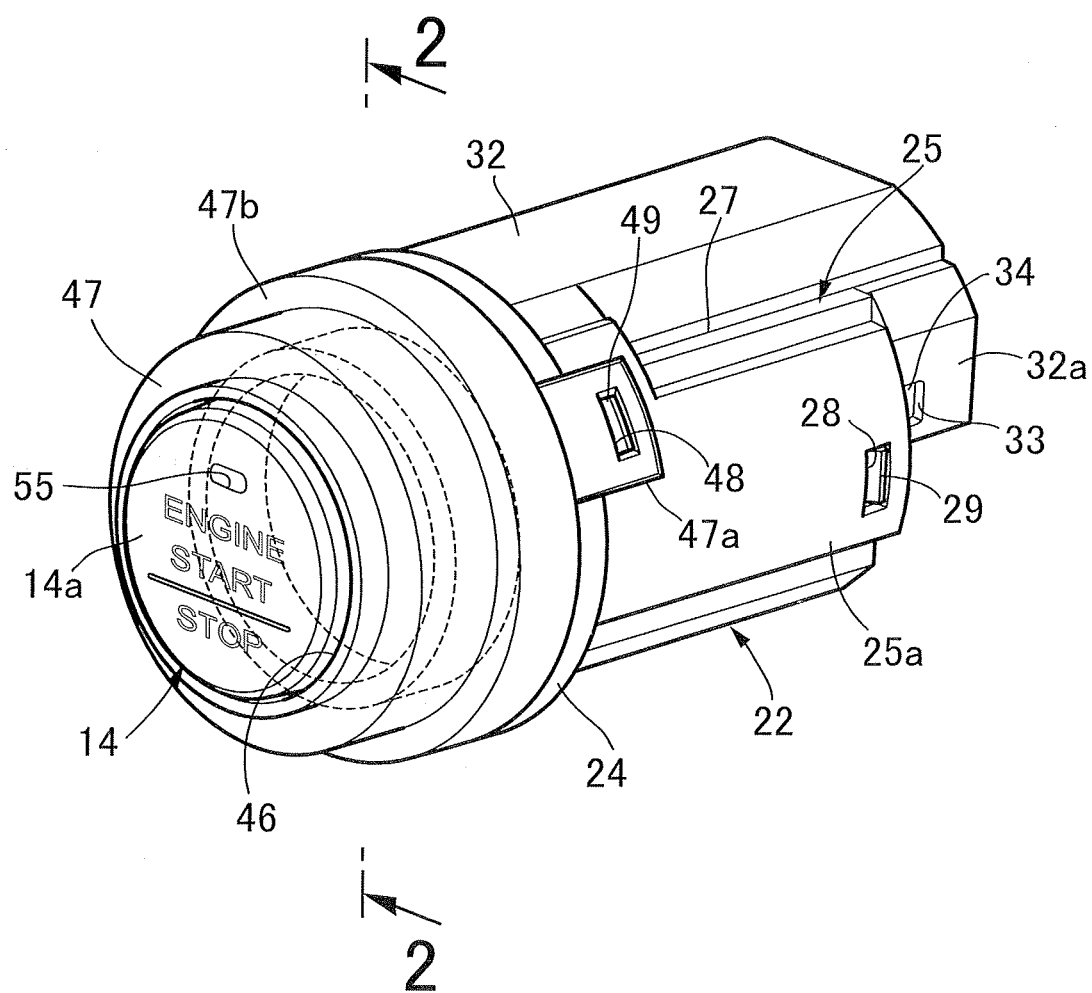
FIG. 1 is an overall perspective view of a starting/stopping switch device of Embodiment 1. (first embodiment)

11 Portable device
12 Transponder
13, 58 Switch unit
14, 59 Push button
15, 60 Coil antenna
16 Switch case
17, 62 Movable member
35, 73 Circuit board
37, 38 Electronic component
39, 40 Recess
65 Terminal
65a Extended portion
75 Connector

MODES FOR CARRYING OUT THE INVENTION

Modes for carrying out the present invention are explained below by reference to the attached drawings.

Embodiment 1

Embodiment 1 of the present invention is explained by reference to FIG. 1 to FIG. 5; first, in FIG. 1 this starting/stopping switch device is for switching between starting and stopping of an engine mounted on a vehicle, the engine is started by a driver pushing a push button 14 in a state in which ID code coincidence between the vehicle and a legitimate portable device 11 (see FIG. 2) carried by the driver is confirmed by intercommunication of ID codes, and the engine is stopped by the driver pushing the push button 14 in a state in which the engine is running.

Figure 2:
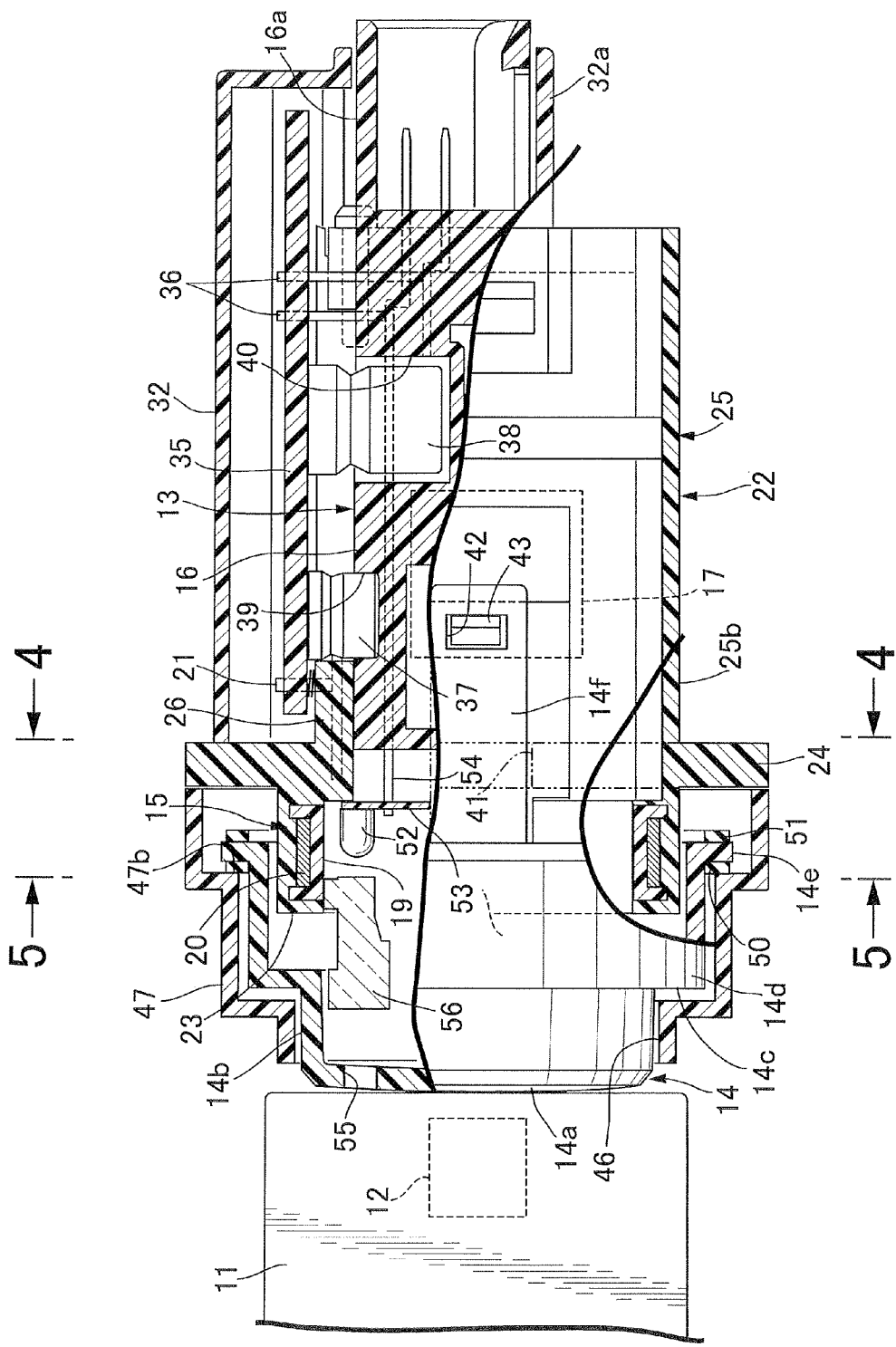
FIG. 2 is a longitudinal side view of the starting/stopping switch device along line 2-2 in FIG. 1. (first embodiment)
Figure 3:
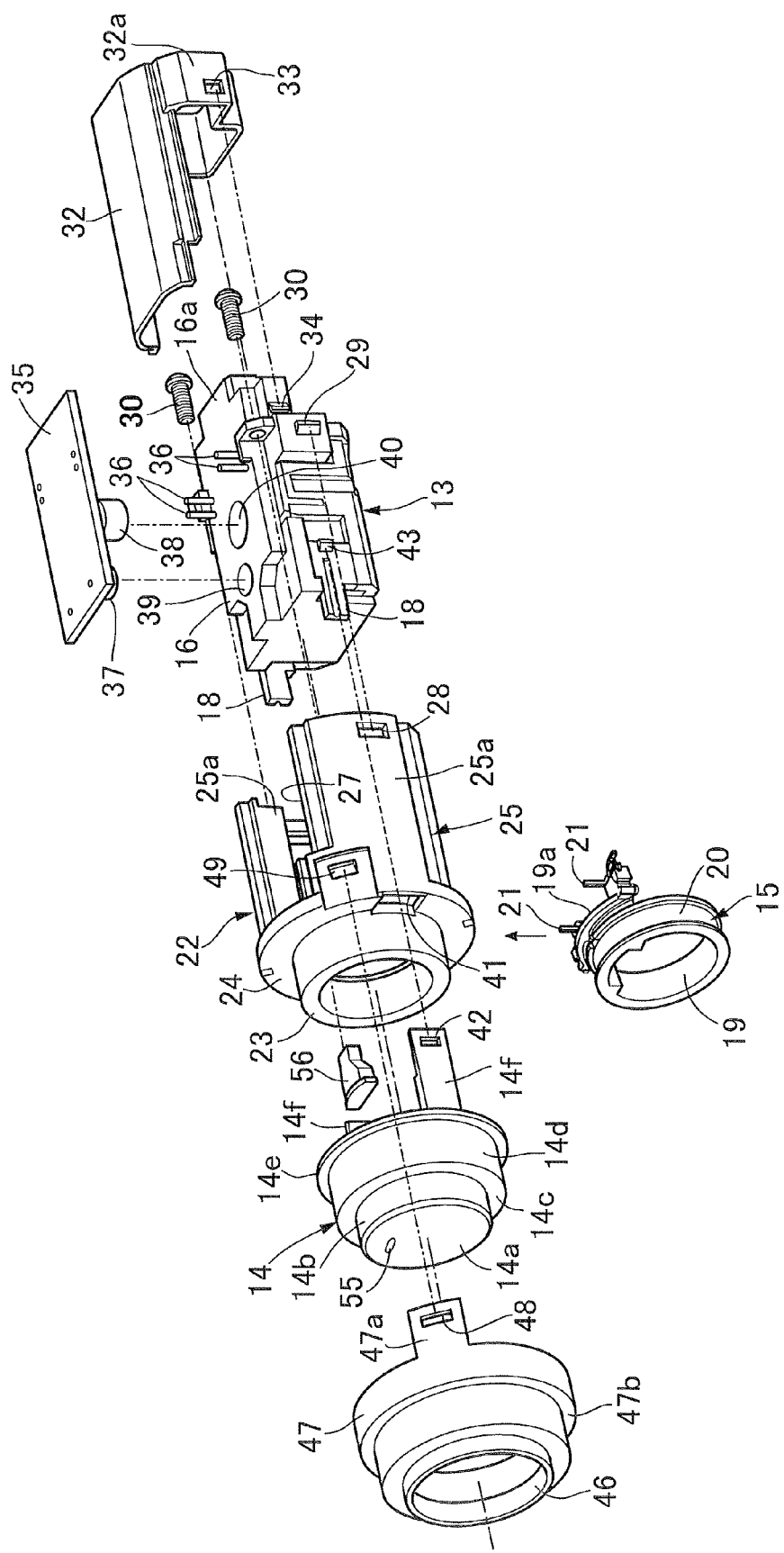
FIG. 3 is an exploded perspective view of the starting/stopping switch device. (first embodiment)

Referring in addition to FIG. 2 and FIG. 3, the starting/stopping switch device is equipped with a switch unit 13, the push button 14 that switches over the switching mode of the switch unit 13 in response to a pushing operation, and a coil antenna 15. When an ID code is not transmitted from the portable device 11 due to exhaustion of a battery of the portable device 11, as shown in FIG. 2, by placing the portable device 11 in the vicinity of the push button 14 a coil antenna 15 outputs transponder drive radio waves, thus generating an electromotive force in a transponder 12 built into the portable device 11 by means of the transponder drive radio waves.

The switch unit 13 includes a switch case 16 that is made of a synthetic resin and a movable member 17 that is housed in the switch case 16 while being movable linearly in the fore-and-aft direction and being spring-biased forward, and a pair of switch-side linking arm parts 18 and 18 extending forward while projecting outward from opposite side faces of the switch case 16 are connected to the movable member 17 so as to move linearly in the fore-and-aft direction together with the movable member 17. A connector portion 16a projecting rearward is provided integrally with a rear part of the switch case 16.

The coil antenna 15 is formed by winding a coil 20 around the outer periphery of a bobbin 19 formed from a synthetic resin into a ring shape, a pair of terminals 21 and 21 are mold bonded to a terminal retaining portion 19a, provided integrally with the bobbin 19, so that parts of the terminals 21 and 21 project, and opposite ends of the coil 20 are electrically connected to the two terminals 21. The coil antenna 15 is mold bonded to an antenna case 22 made of a synthetic resin.

Figure 4:
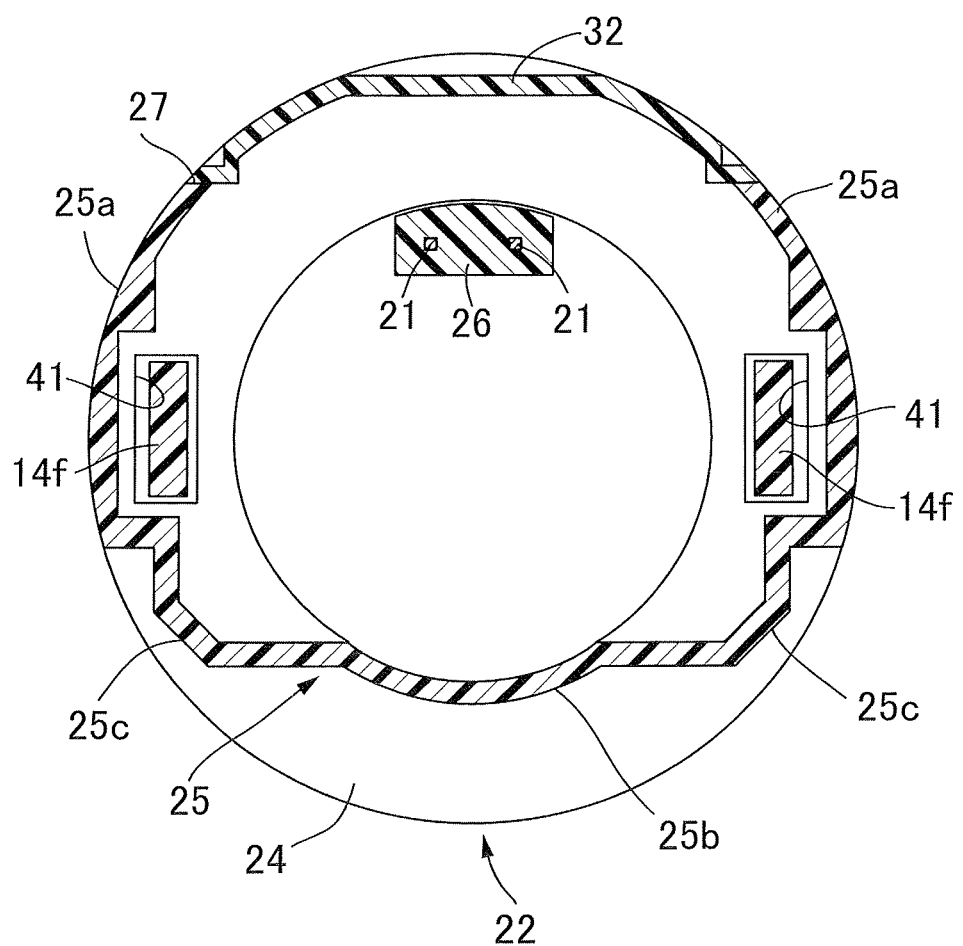
FIG. 4 is a sectional view along line 4-4 in FIG. 2. (first embodiment)

Referring in addition to FIG. 4, the antenna case 22 integrally has a cylindrical part 23 that encapsulates the bobbin 19 and the coil 20 while having its inner periphery facing an inner peripheral face of the bobbin 19, a flange part 24 that protrudes radially outward from the rear end of the cylindrical part 23, a switch housing part 25 that extends rearward from the flange part 24, and a projection 26 that encapsulates the terminal retaining portion 19a of the coil antenna 15 and projects rearward from the flange part 24.

The switch housing part 25 is formed so as to have a pair of left and right side wall portions 25a and 25a that have a cutout part 27 formed between ends thereof, on one side, in the peripheral direction so that their outer peripheral faces are flush with an outer peripheral face of the flange part 24, an arc wall portion 25b that is disposed coaxially with the cylindrical part 23 while making its outer peripheral face follow a virtual circle having the same radius as the outer radius of the cylindrical part 23, and a pair of linking wall portions 25c and 25c connecting opposite ends of the arc wall portion 25b and the other ends of the two side wall portions 25a, the projection 26 being disposed in a front part within the cutout part 27.

The switch unit 13 is inserted into the interior of the switch housing part 25 of the antenna case 22 from the rear, engagement projections 29 projectingly provided on the switch case 16 of the switch unit 13 are resiliently engaged from the inside of the antenna case 22 with a plurality of latching holes 28 provided in a rear part of the switch housing part 25, and the switch case 16 is secured to the rear part of the switch housing part 25 by means of a plurality, for example a pair, of screw members 30 and 30. Furthermore, the cutout part 27 possessed by the antenna case 22 is covered by a cover plate 32 that has opposite side ends in contact with the pair of left and right side wall portions 25a and 25a in the switch housing part 25; this cover plate 32 is provided integrally with a tubular portion 32a having a rectangular cross-section into which is inserted the connector portion 16a at the rear end of the switch case 16 of the switch unit 13, and engagement projections 34 projectingly provided on an outer face of the connector portion 16a are resiliently engaged with a plurality of latching holes 33 provided in the tubular portion 32a.

The pair of terminals 21 project from the projection 26 of the antenna case 22. At a position that is to the side of the switch case 16 possessed by the switch unit 13 and that corresponds to the cutout part 27, a circuit board 35 that extends parallel to the direction of movement of the movable member 17, that is, the fore-and-aft direction in the switch unit 13, is disposed so as to be covered by the cover plate 32, and the terminals 21 are connected to a front part of the circuit board 35. Furthermore, a plurality of bus bars 36 projecting from a rear part of the switch case 16 are connected to a rear part of the circuit board 35.

Mounted on the circuit board 35 are for example a pair of electronic components 37 and 38, and provided in the switch case 16 are for example a pair of recesses 39 and 40 so that the electronic components 37 and 38 are individually inserted thereinto.

Figure 5:
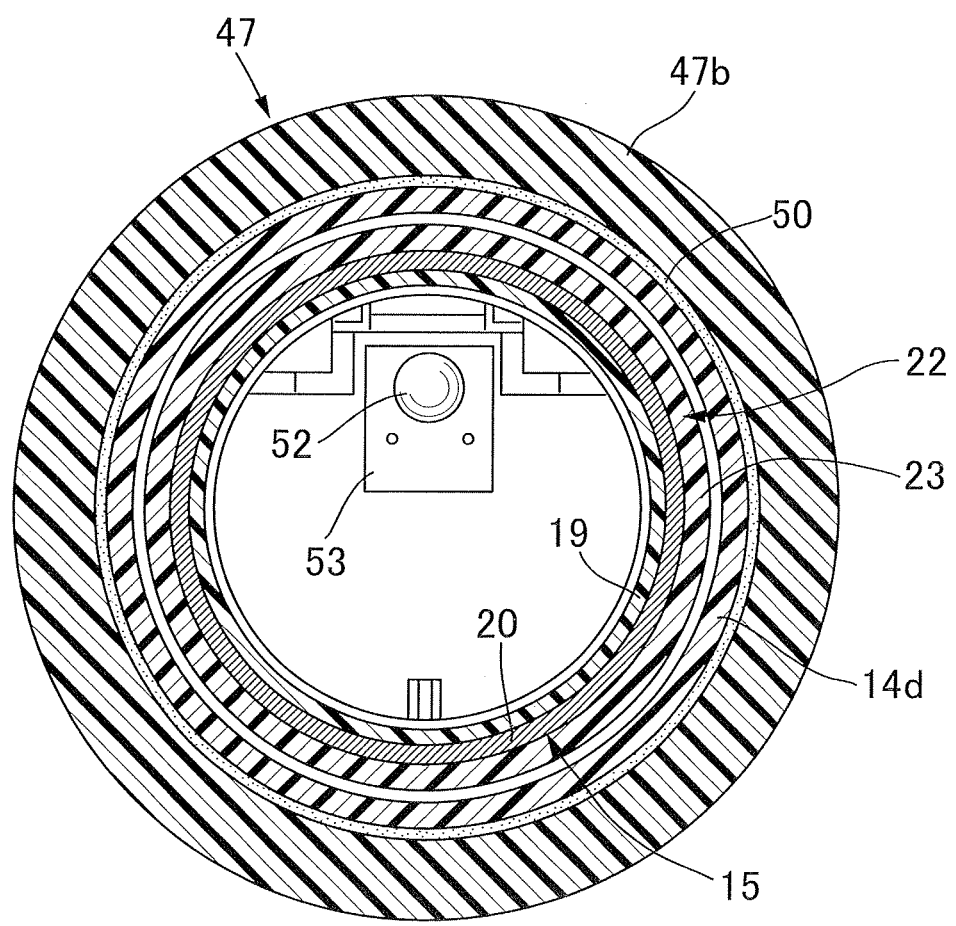
FIG. 5 is a sectional view along line 5-5 in FIG. 2. (first embodiment)

Referring in addition to FIG. 5, the push button 14 is formed into a bottomed cylindrical shape with its front end closed, is disposed coaxially with the cylindrical part 23 of the antenna case 22, and is linked to the movable member 17 so as to drive the movable member 17 in response to a pushing operation.

The push button 14 integrally has a disk-shaped end wall portion 14a disposed at the front end, a small diameter cylindrical portion 14b connected to the outer periphery of the end wall portion 14a and extending rearward, an annular step portion 14c protruding radially outward from the rear end of the small diameter cylindrical portion 14b, a large diameter cylindrical portion 14d connected to the outer periphery of the step portion 14c and extending rearward, and a flange portion 14e protruding radially outward from the rear end of the large diameter cylindrical portion 14d.

Moreover, the internal diameter of the large diameter cylindrical portion 14d is set larger than the outer diameter of the cylindrical part 23 in a front part of the antenna case 22, and the large diameter cylindrical portion 14d surrounds part of the coil antenna 15 mold bonded to the cylindrical part 23 when a pushing operation is not being carried out on the push button 14. That is, the coil antenna 15 is disposed coaxially with the push button 14 so that at least part thereof is inserted into the interior of the push button 14.

Furthermore, a pair of push button-side linking arm portions 14f and 14f positioned on one diameter of the large diameter cylindrical portion 14d extend rearward from the rear end of the large diameter cylindrical portion 14d, and these push button-side linking arm portions 14f are inserted into the interior of the switch housing part 25 of the antenna case 22 via through holes 41 (see FIG. 3) provided in the flange part 24 of the antenna case 22 at positions corresponding to the side wall portions 25a of the switch housing part 25 in the antenna case 22. On the other hand, the switch case 16 of the switch unit 13 is inserted into and fixed within the switch housing part 25, and a pair of switch-side linking arm parts 18 projecting from the switch case 16 are linked to the respective push button-side linking arm portions 14f while overlapping them from the inside. That is, engagement projections 43 projectingly provided on a rear part of the switch-side linking arm parts 18 are resiliently engaged with latching holes 42 provided at the rear end of the push button-side linking arm portions 14f. This allows the push button 14 to be linked to the movable member 17 of the switch unit 13, and due to the movable member 17 being spring-biased forward the push button 14 is also spring-biased forward.

Moreover, the push button 14 is covered by a garnish 47 having at the front end a circular opening 46 that a front part of the push button 14 faces, and this garnish 47 is mounted on the antenna case 22. That is, engagement projections 49 projectingly provided on a front outer face of the switch housing part 25 in the antenna case 22 are resiliently engaged with latching holes 48 provided in a pair of arm portions 47a provided integrally with the garnish 47 and extending rearward.

An annular restricting step portion 47b facing the flange portion 14e of the push button 14 from the front is provided on the garnish 47, and a front stopper 50 that is formed into a ring shape from a resilient material and adhered to a front face of the flange portion 14e abuts against the restricting step portion 47b to thus restrict the end of forward movement of the push button 14. Furthermore, a rear stopper 51 that is formed into a ring shape from a resilient material and adhered to a rear face of the flange portion 14e abuts against the flange part 24 of the antenna case 22 to thus restrict the end of rearward movement of the push button 14.

Moreover, an LED board 53 having an LED 52 mounted on a front face is disposed within a rear part of the cylindrical part 23 of the antenna case 22, and front end parts of bus bars 54 that are embedded in the switch case 16 of the switch unit 13 and extend in the fore-and-aft direction are connected to the LED board 53. Furthermore, a window 55 is provided in a portion, corresponding to the LED 52, of the end wall portion 14a of the push button 14, and a lens 56 present between the window 55 and the LED 52 is engaged with the bobbin 19 of the coil antenna 15.

The operation of Embodiment 1 above is now explained; since at least part of the coil antenna 15, which is coaxial with the push button 14, is inserted into the interior of the push button 14, the degree of freedom in the outer diameter and shape of the push button 14 increases, and the operability can be enhanced by increasing the size of the push button 14. Moreover, since it becomes unnecessary for a member for supporting the coil antenna 15 to be disposed on the outside of the push button 14, the switch device can be reduced in size in the radial direction of the push button 14, and the space for mounting it in a vehicle can be reduced compared with a conventional switch device.

Furthermore, since the circuit board 35, which extends parallel to the direction of movement of the movable member 17, is disposed to the side of the switch case 16 of the switch unit 13, and the recesses 39 and 40, into which are inserted the electronic components 37 and 38 mounted on the circuit board 35, are provided in the switch case 16, it is possible to further reduce the size of the switch device in the radial direction of the push button 14.

Embodiment 2

Figure 6:
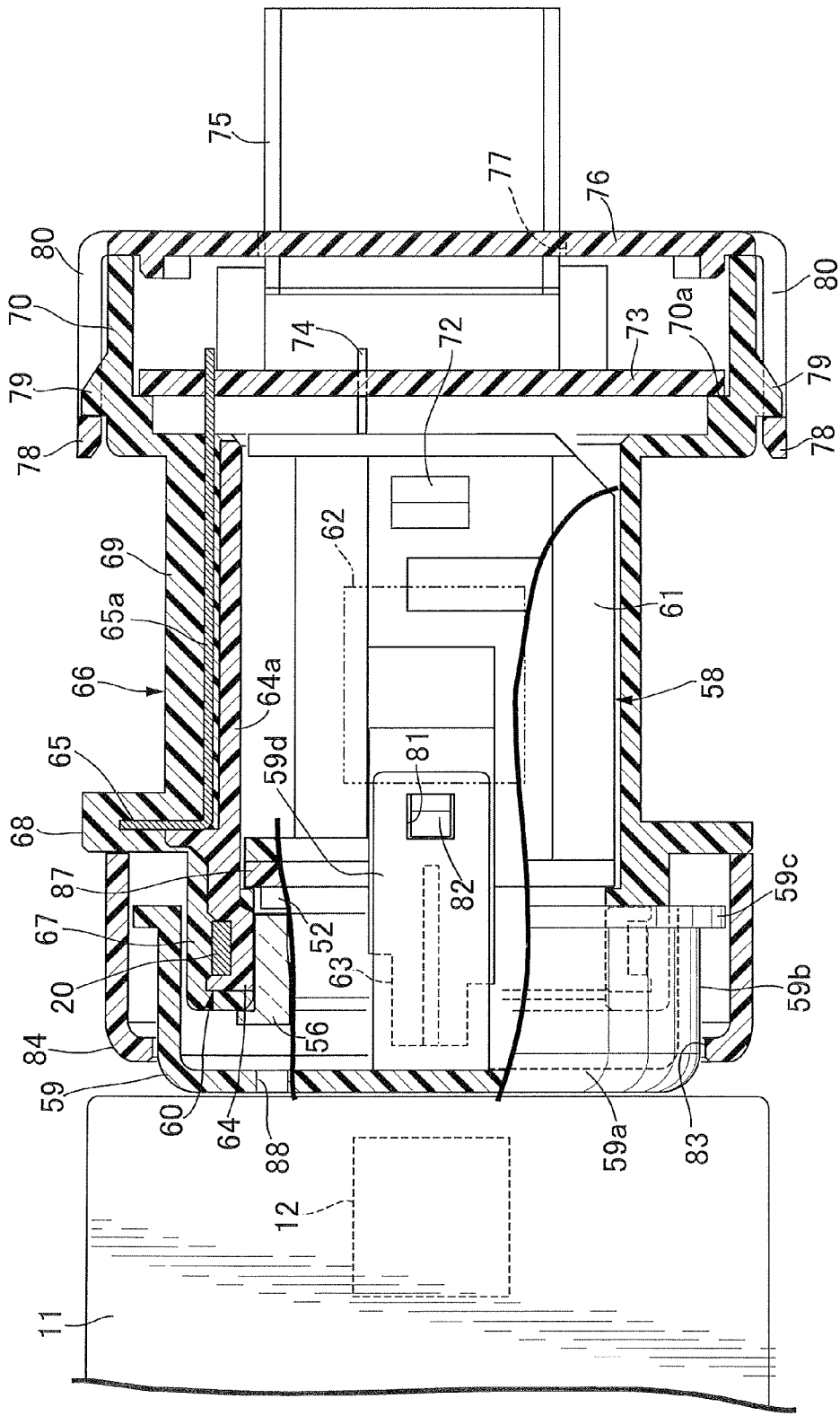
FIG. 6 is a longitudinal side view of a starting/stopping switch device of Embodiment 2. (second embodiment)
Figure 7:
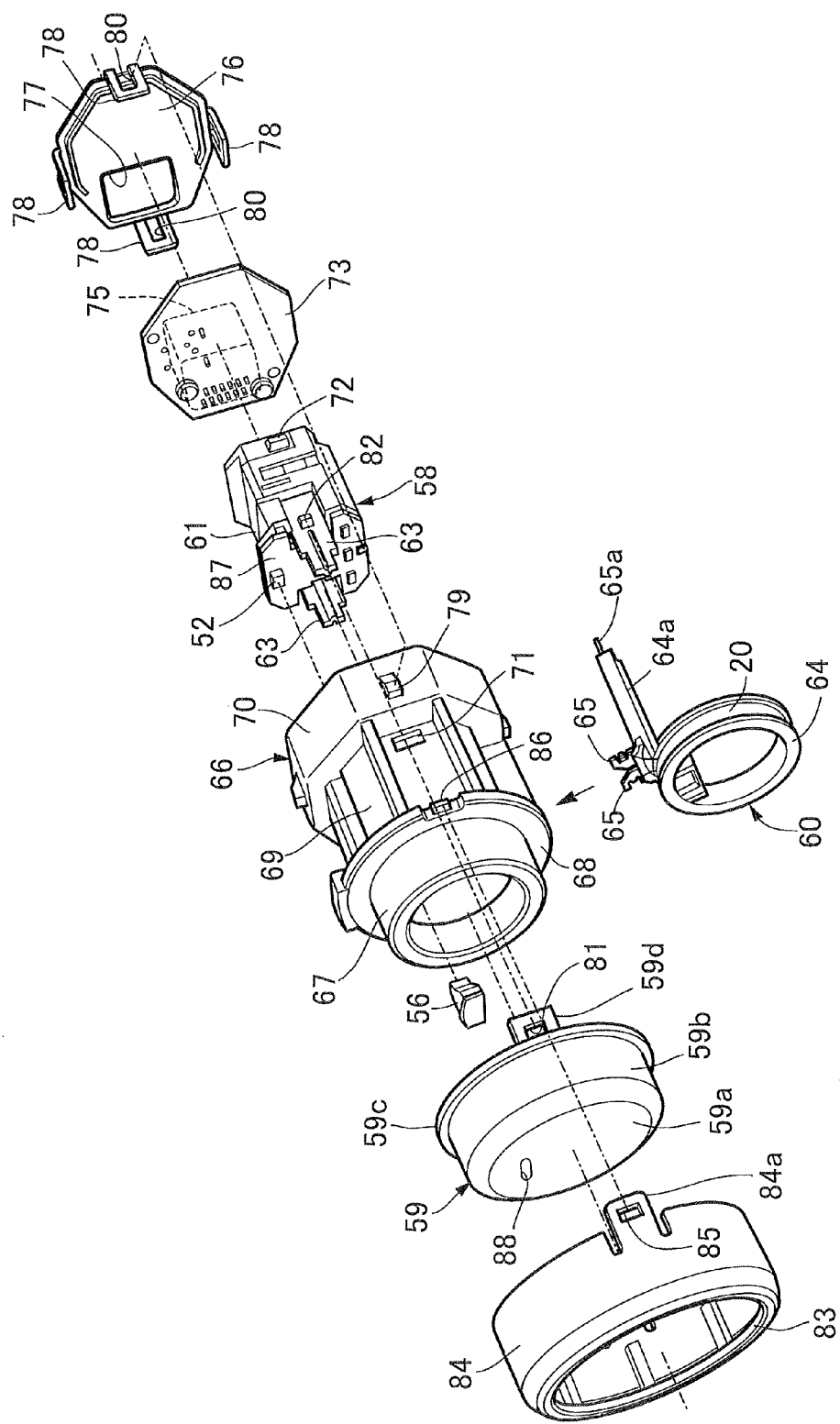
FIG. 7 is an exploded perspective view of the starting/stopping switch device. (second embodiment)

Embodiment 2 of the present invention is explained by reference to FIG. 6 and FIG. 7; this starting/stopping switch device is equipped with a switch unit 58, a push button 59 that switches over the switching mode of the switch unit 58 in response to a pushing operation, and a coil antenna 60.

The switch unit 58 includes a switch case 61 that is made of a synthetic resin and a movable member 62 that is housed in the switch case 61 while being movable linearly in the fore-and-aft direction and being spring-biased forward, and a pair of switch-side linking arm parts 63 and 63 extending forward while projecting outward from opposite side faces of the switch case 61 are connected to the movable member 62 so as to move linearly in the fore-and-aft direction together with the movable member 62.

The coil antenna 60 is formed by winding a coil 20 around the outer periphery of a bobbin 64 formed from a synthetic resin into a ring shape, a pair of terminals 65 and 65 are mold bonded to a terminal retaining portion 64a provided integrally with the bobbin 64 so that parts thereof project, and opposite ends of the coil 20 are electrically connected to the two terminals 65. Moreover, extended portions 65a extending parallel to the axis of the coil antenna 60 are provided integrally with the two terminals 65, and the terminal retaining portion 64a extends lengthwise to the rear from the bobbin 64 and retains the extended portions 65a.

This coil antenna 60 is mold bonded to an antenna case 66 that is formed from a synthetic resin, and the antenna case 66 integrally has a cylindrical part 67 that encapsulates the bobbin 64 and the coil 20 while having an inner peripheral face of the bobbin 64 facing its inner periphery, a flange part 68 that protrudes radially outward from the rear end of the cylindrical part 67, a tubular switch housing part 69 that extends rearward from the flange part 68, and a tubular board housing part 70 that has a larger diameter than the switch housing part 69 and is joined to the rear end of the switch housing part 69, the terminal retaining portion 64a in the coil antenna 60 being embedded in a side wall of the switch housing part 69, and the rear ends of the extended portions 65a in the terminals 65 projecting within the board housing part 70.

The switch unit 58 is inserted into the interior of the switch housing part 69 of the antenna case 66 from the rear, and by resiliently engaging from the inside of the antenna case 66 engagement projections 72 projectingly provided on the switch case 61 of the switch unit 58 with a plurality of latching holes 71 provided in a rear part of the switch housing part 69, the switch case 61 is housed in and fixed within the switch housing part 69.

Housed within the board housing part 70 of the antenna case 66 is a circuit board 73 disposed so as to follow a plane that is perpendicular to the axis of the coil antenna 60, and fixed to the board housing part 70 so as to abut against a step portion 70a that is provided on an inner face of the board housing part 70 and faces rearward is an outer peripheral part of the circuit board 73.

The circuit board 73 has the coil antenna 60 connected thereto via the terminals 65, and rear parts of the extended portions 65a that are provided integrally with the terminals 65 and extend parallel to the axis of the coil antenna 60 are connected to the circuit board 73. Furthermore, a plurality of bus bars 74 projecting from a rear part of the switch case 61 of the switch unit 58 are connected to the circuit board 73.

Directly fixed to the circuit board 73 is a connector 75 projecting toward the rear thereof. An opening at the rear end of the board housing part 70 is closed by a cover member 76, an opening 77 for allowing the connector 75 to extend therethrough is provided in the cover member 76, and the connector 75 projects toward the rear from the cover member 76.

Arm parts 78 running along the outer periphery of the board housing part 70 are provided at a plurality of positions in the peripheral direction of the cover member 76, and engagement arm parts 79 projectingly provided on the outer periphery of a front part of the board housing part 70 so as to correspond to the arm parts 78 resiliently engage with latching holes 80 provided in the respective arm parts 78, thereby allowing the cover member 76 to be detachably fitted onto the board housing part 70, that is, the antenna case 66.

The push button 59 is formed into a bottomed cylindrical shape with its front end closed, is disposed coaxially with the cylindrical part 67 of the antenna case 66, and is linked to the movable member 62 so as to drive the movable member 62 in response to a pushing operation.

The push button 59 integrally has a disk-shaped end wall portion 59a disposed at the front end, a cylindrical portion 59b connected to the outer periphery of the end wall portion 59a and extending rearward, and an annular flange portion 59c protruding radially outward from the rear end of the cylindrical portion 59b.

Moreover, the internal diameter of the cylindrical portion 59b is set larger than the outer diameter of the cylindrical part 67 in the front part of the antenna case 66, and the cylindrical portion 59b surrounds part of the coil antenna 60 mold bonded to the cylindrical part 67 when a pushing operation is not being carried out on the push button 59. That is, the coil antenna 60 is disposed coaxially with the push button 59 so that at least part thereof is inserted into the interior of the push button 59.

Furthermore, a pair of push button-side linking arm portions 59d that are positioned on one diameter of the end wall portion 59a of the push button 59 extend rearward from the end wall portion 59a, and a pair of switch-side linking arm parts 63 projecting from the switch case 61 of the switch unit 58 inserted into the interior of the switch housing part 69 of the antenna case 66 are linked to the respective push button-side linking arm portions 59d while overlapping them from the inside. That is, engagement projections 82 projectingly provided on rear parts of the switch-side linking arm parts 63 are resiliently engaged with latching holes 81 provided at the rear ends of the push button-side linking arm portions 59d. This allows the push button 59 to be linked to the movable member 62 of the switch unit 58, and due to the movable member 62 being spring-biased forward the push button 59 is also spring-biased forward.

Moreover, the push button 59 is covered by a bottomed cylindrical garnish 84 having at the front end a circular opening 83 that a front part of the push button 59 faces, and this garnish 84 is mounted on the antenna case 66. That is, engagement projections 86 projectingly provided on the outer periphery of the flange part 68 of the antenna case 66 are resiliently engaged with latching holes 85 provided in a pair of arm portions 84a that are provided integrally with the garnish 84 and extend rearward.

Furthermore, an LED board 87 for mounting an LED 52 is fixed to a front face of the switch case 61 of the switch unit 58, a window 88 is provided in a portion, corresponding to the LED 52, of the end wall portion 59a of the push button 59, and a lens 56 present between the window 88 and the LED 52 is engaged with the bobbin 64 of the coil antenna 60.

In accordance with Embodiment 2, since at least part of the coil antenna 60, which is coaxial with the push button 59, is inserted into the interior of the push button 59, the degree of freedom in the outer diameter and shape of the push button 59 increases, and the operability can be enhanced by increasing the size of the push button 59. Moreover, since it becomes unnecessary for a member for supporting the coil antenna 60 to be disposed on the outside of the push button 59, the switch device can be reduced in size in the radial direction of the push button 59, and the space for mounting it in a vehicle can be reduced compared with a conventional switch device.

Furthermore, since the circuit board 73 connected to the coil antenna 60 via the terminals 65 is disposed so as to follow the plane that is perpendicular to the axis of the coil antenna 60, it is possible to reduce the size of the switch device in the axial direction of the coil antenna 60 and the push button 59.

Moreover, since the connector 75 is directly fixed to the circuit board 73, the structure can be simplified, and assembly of the circuit board 73 and the connector 75 can be made easy with the connector 75 being fixed to the circuit board 73 in advance.

Furthermore, since the extended portions 65a, which extend parallel to the axis of the coil antenna 60, are provided integrally with the terminals 65, and the extended portions 65a are connected to the circuit board 73, connection between the coil antenna 60 and the circuit board 73 is possible with the terminals 65, which have a simple shape, and connecting the terminals 65 to the circuit board 73 is made easy, thus enhancing the ease of assembly.

Embodiments of the present invention are explained above, but the present invention is not limited to the embodiments above and may be modified in a variety of ways as long as the modifications do not depart from the spirit and scope thereof.

The invention claimed is:

1. An engine starting/stopping switch device comprising a switch unit that has a switch case and switches over switching modes in response to linear movement of a movable member which is housed in the switch case, a push button that is formed into a bottomed cylindrical shape with a front end thereof closed and is linked to the movable member so as to drive the movable member in response to a pushing operation, and a coil antenna that outputs transponder drive radio waves for generating an electromotive force in a transponder built into a portable device, placing the portable device in the vicinity of the push button enabling ID signal verification between the transponder and a vehicle to be carried out when the voltage of a battery built into the portable device is low, wherein the coil antenna is held in an antenna case which is connected to the switch case, said coil antenna being disposed coaxially with the push button so that at least part of the coil antenna is inserted into the interior of the push button.

2. The engine starting/stopping switch device according to claim 1, wherein a circuit board extending parallel to the direction of movement of the movable member is disposed to a side of the switch case of the switch unit, and a recess into which an electronic component mounted on the circuit board is inserted is provided in the switch case (16).

3. The engine starting/stopping switch device according to claim 1, wherein a circuit board connected to the coil antenna via a terminal is disposed so as to follow a plane that is perpendicular to an axis of the coil antenna.

4. The engine starting/stopping switch device according to claim 2, wherein a connector is directly fixed to the circuit board.

5. The engine starting/stopping switch device according to claim 3, wherein an extended portion extending parallel to the axis of the coil antenna is provided integrally with the terminal, and the extended portion is connected to the circuit board.

6. The engine starting/stopping switch device according to claim 3, wherein a connector is directly fixed to the circuit board.

7. The engine starting/stopping switch device according to claim 1, wherein
the switch case is provided inside the antenna case,
the coil antenna is formed of a coil being wound around a bobbin,
a terminal connected to the coil is mold bonded to the bobbin with part of the terminal projecting from the bobbin, and
the bobbin and the terminal bonded together are housed in the antenna case.

* * * * *